United States Patent
Liu et al.

(10) Patent No.: US 11,079,973 B2
(45) Date of Patent: Aug. 3, 2021

(54) PRINTING OF ELECTRONIC MESSAGES BASED ON KEYWORD MATCHING

(71) Applicant: Hewlett-Packard Development Company, L.P., Spring, TX (US)

(72) Inventors: Xiao Liu, Shanghai (CN); Lin-Lin Zhao, Shanghai (CN); Yi Yang, Shanghai (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 79 days.

(21) Appl. No.: 16/499,442

(22) PCT Filed: Apr. 24, 2017

(86) PCT No.: PCT/CN2017/081601
§ 371 (c)(1),
(2) Date: Sep. 30, 2019

(87) PCT Pub. No.: WO2018/195688
PCT Pub. Date: Nov. 1, 2018

(65) Prior Publication Data
US 2021/0096783 A1   Apr. 1, 2021

(51) Int. Cl.
*G06F 15/00* (2006.01)
*G06F 3/12* (2006.01)
*G06K 1/00* (2006.01)

(52) U.S. Cl.
CPC ............ *G06F 3/1204* (2013.01); *G06F 3/126* (2013.01); *G06F 3/1287* (2013.01)

(58) Field of Classification Search
CPC ....... G06F 3/1204; G06F 3/126; G06F 3/1287
USPC ............................ 358/1.15, 1.13, 1.14, 1.1
See application file for complete search history.

(56) References Cited

U.S. PATENT DOCUMENTS

| | | | |
|---|---|---|---|
| 9,696,904 B1* | 7/2017 | Mohapatra | G06F 3/04895 |
| 2004/0133649 A1 | 7/2004 | Kim et al. | |
| 2014/0280616 A1 | 9/2014 | Ramanathan et al. | |
| 2015/0200899 A1 | 7/2015 | Sanketi et al. | |
| 2018/0307687 A1* | 10/2018 | Natkin | G06F 16/24578 |
| 2018/0349389 A1* | 12/2018 | Ferrydiansyah | G06Q 10/10 |
| 2020/0264815 A1* | 8/2020 | Fujiwara | G06F 3/1256 |

FOREIGN PATENT DOCUMENTS

| | | |
|---|---|---|
| CN | 103024237 A | 4/2013 |
| CN | 103024238 A | 4/2013 |
| CN | 104484140 A | 4/2015 |
| CN | 106227902 A | 12/2016 |
| JP | 2015060321 | 3/2015 |

OTHER PUBLICATIONS

Automatic Message Processing Tools, Nov. 7, 2014, https://www.slipstick.com/addins/—17 pages.
Automatically Prints In/out Messages And/or Attachments—Jan. 17, 2017—http://www.softpedia.com/—17 pages.

* cited by examiner

*Primary Examiner* — Douglas Q Tran
(74) *Attorney, Agent, or Firm* — Perry + Currier

(57) ABSTRACT

Data of electronic messages are compared to a keyword or keywords. A suggestion to print an electronic message that contains data that matches the keyword may be presented to a user via a user interface. A response to the suggestion may be received from the user via the user interface. Printing of the electronic message that contains data that matches the keyword is initiated to a printer.

15 Claims, 11 Drawing Sheets

DATA STRUCTURE
250

| UNIQUE MESSAGE ID 252 | SUGGESTED? 254 |
|---|---|
| 1000 | TRUE |
| 1001 | TRUE |
| ⋮ | ⋮ |
| 1050 | FALSE |

262 ticket, airline

264 → OR ▽ boarding pass

OR ▽ hotel, reservation

266 → ☑ Check every [30] [minutes ▽]

268 → ☐ Check when logging in

☐ Check as messages are received

270 → ○ Print automatically    ● Ask me before printing

[Save and Close]    [Cancel]

FIG. 13

PRINTING OF ELECTRONIC MESSAGES BASED ON KEYWORD MATCHING

BACKGROUND

It is frequently desirable to print electronic messages, such as email. People often print important documents, such as tickets, hotel reservations, and similar. Even with the popularity of network storage systems and mobile devices, hardcopy documents continue to be widely used.

It can, however, sometimes be difficult or inconvenient for people to remember to print important messages.

BRIEF DESCRIPTION OF THE DRAWINGS

FIG. 12 is diagram of an example data structure.

FIG. 13 is diagram of an example user interface component that may be used to select how matching and printing of messages is performed.

DETAILED DESCRIPTION

Printed documents are widely accepted, are often more convenient to use, and can serve as contingency documents when electronic documents are not available, such as may happen with a poor data connection or a drained battery. Electronic messages, such as email, having content that a user may wish to print may be identified by comparing message data to a keyword or a plurality of keywords. Messages that match a keyword may be printed after a suggestion to print has been confirmed by a user. As such, the user may be informed of the presence of a message that they may wish to print, and may take action to have the message printed. This may reduce the need for the user to remember past messages or search though many irrelevant messages. These and other aspects of the present disclosure are described herein.

Figure 1:
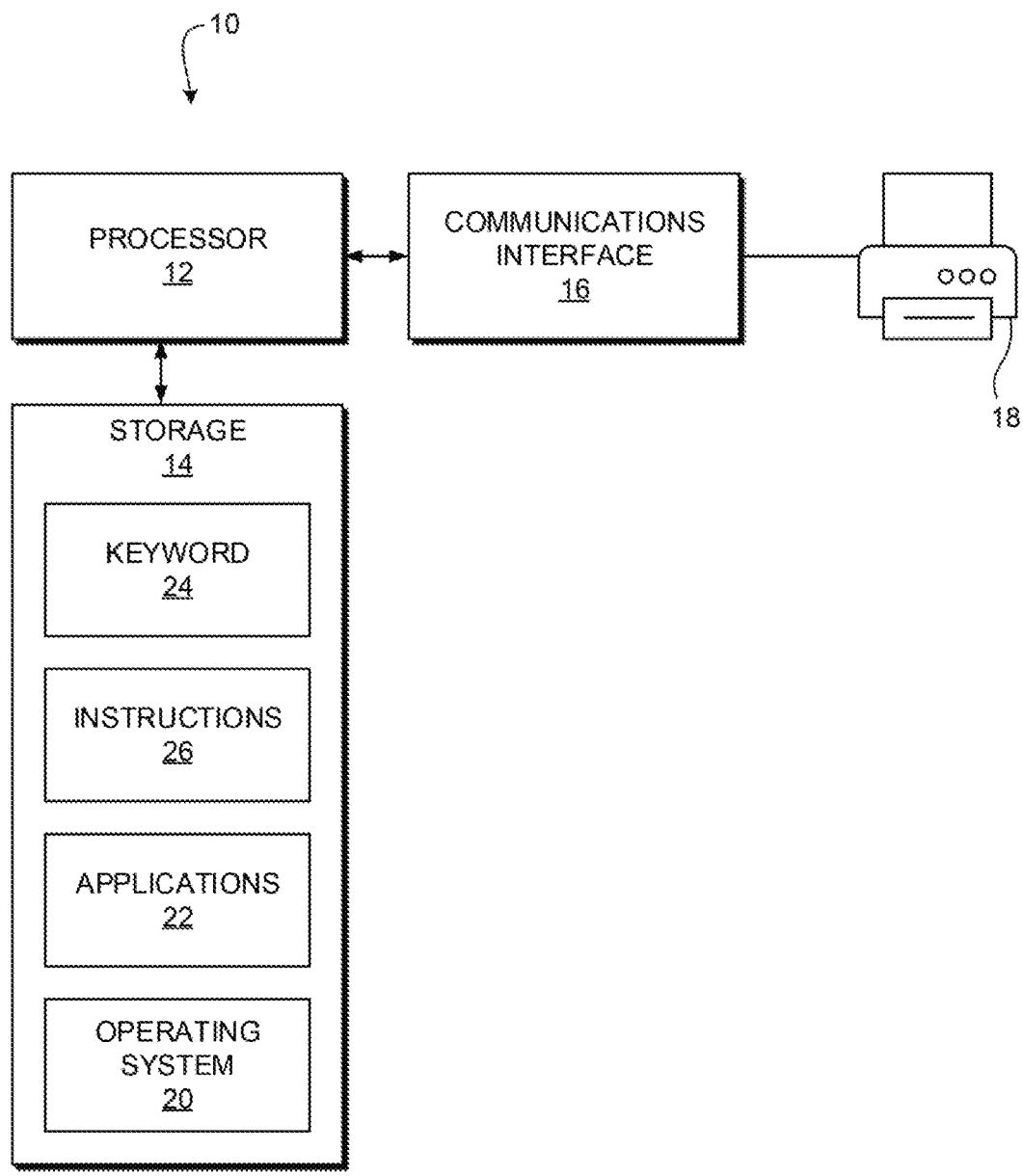
FIG. 1 is a block diagram of an example computer system.

An example computer system 10 may include a processor 12, a storage 14, and a communications interface 16, as shown in FIG. 1

The processor 12 may include a central processing units (CPU), a microcontroller, a microprocessor, a processing core, a field-programmable gate array (FPGA), or similar. The processor 12 and storage 14 cooperate to execute instructions.

The storage 14 is coupled to the processor 12 and may include a non-transitory machine-readable storage medium that may be any electronic, magnetic, optical, or other physical storage device that stores executable instructions. The machine-readable storage medium may include, for example, random access memory (RAM), electrically-erasable programmable read-only memory (EEPROM), flash memory, a storage drive, an optical disc, and the like. The machine-readable storage medium may be encoded with executable instructions for initiating the printing of electronic messages.

The communications interface 16 is coupled to the processor 12 and allows the processor 12 to communicate data to a printer 18. The communications interface 16 may include a universal serial bus (USB) port, a serial port, a parallel port, a wired network adaptor, a wireless network adaptor, or similar. The printer 18 may be directly connected to the computer system 10 or may be connected to the computer system 10 through a network, such as a local-area network (LAN), a wide-area network (WAN), the Internet, and similar. Printing may be performed using a physical medium, such as paper.

The storage 14 may store an operating system 20 that is executable by the processor 12 to provide general functionality to the computer system 10, including functionality to support applications. Examples of operating systems include Windows™, macOS™, iOS™, Android™, Linux™, and Unix™. The storage 14 may further store applications 22 that are executable by the processor 12 to provide specific functionality to the computer system 10, such as functionality to maintain a plurality of electronic messages including composing, sending, and receiving electronic messages.

Examples of applications 22 for maintaining electronic messages may include email user agents such as Microsoft Outlook™ and Apple iOS Mail™ and web browsers, such as the Google Chrome™ browser and the Mozilla Firefox™ browser. These applications may have server-based components, such as Microsoft Exchange Server™, Google Gmail™, Yahoo Mail™, and similar.

The storage 14 may store a keyword 24 and a set of instructions 26 to initiate printing of an electronic message when data of the electronic message matches the keyword 24. Message data that is matched with keywords may include textual elements such as message body text, subject line text, metadata, text descriptors of embedded images, text contained in attachments, filenames of attachments, and similar. The instructions 26 may make the keyword 24 selectable by the user. More than one keyword 24 may be used to determine a match. A keyword may be a single word, such as "ticket", or a phrase, such as "airline ticket." When a plurality of keywords is compared to message data, a logical relationship among the keywords may be applied.

Any message data, such as message body text, subject line text, metadata, embedded images, text descriptors of embedded images, attachments, filenames of attachments, and similar, may be printed when a message is found to match a keyword. For example, message body text, subject line text, any embedded images, and any attachments may all be printed when a message is printed.

Figure 2:
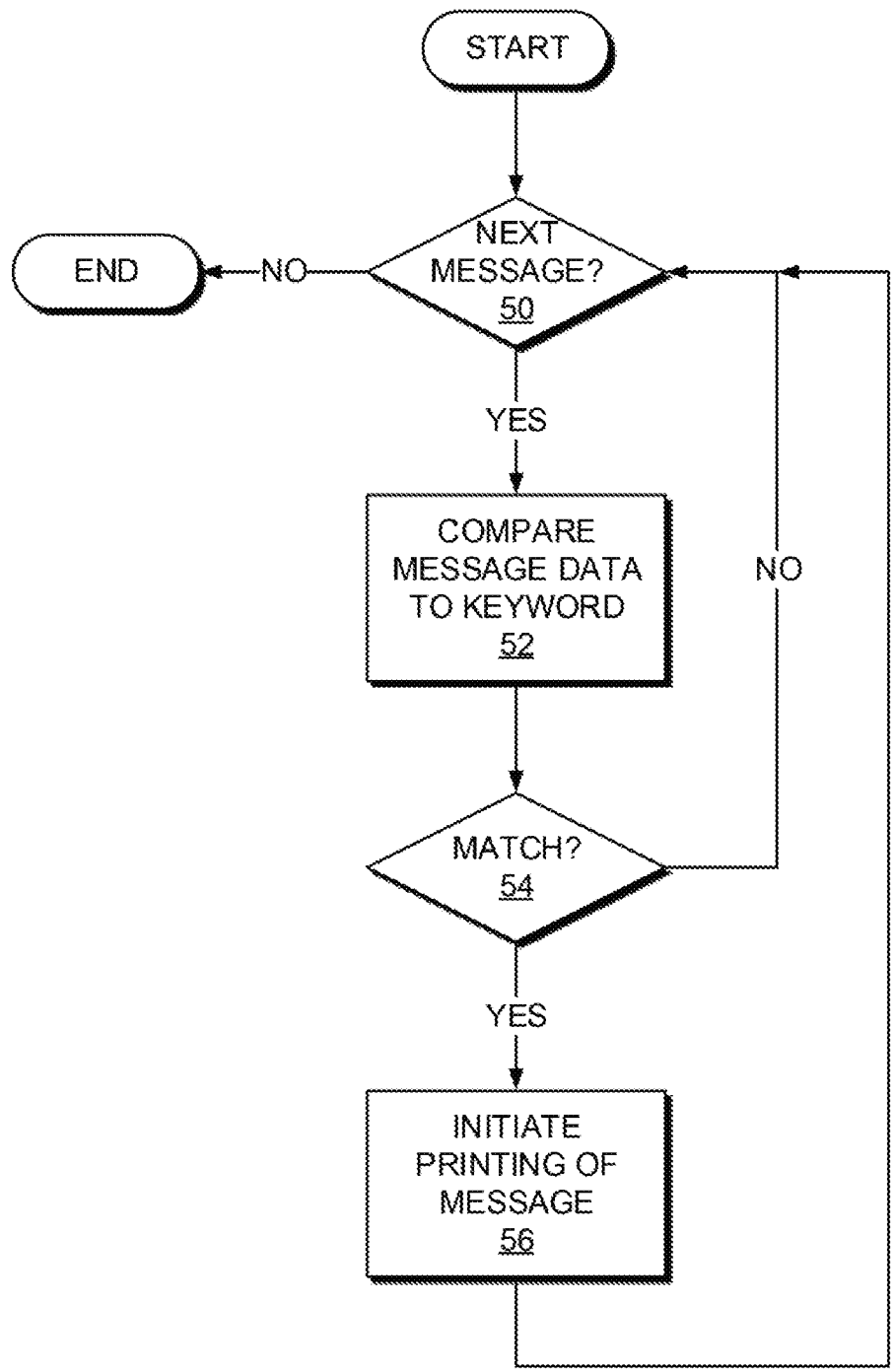
FIG. 2 is a flowchart of an example method of initiating printing of an electronic message.

FIG. 2 shows a flowchart of a method of initiating printing of an electronic message. The method may be realized with the set of instructions 26, for example.

Each message of a plurality of electronic messages may be checked, via block 50. Checking one message is possible.

At block 52, data of the message being checked is compared to a keyword. Textual elements of the message may be compared to a keyword. Regular expressions, wildcards, word stemming, and similar techniques may be used to account for capitalization, spacing, punctuation, spelling variation, typographical errors, wording choices, and the like. For example, a keyword of "ticket" may be considered a match against message text of "ticket", "Tickets", and "tickt".

At block 54, any identification of a match of the electronic message with the keyword is determined. When no match is identified, the electronic message is not printed, and the next message, if any, may be checked.

At block 56, the electronic message is determined to match the keyword and printing of the electronic message may be initiated. Initiating printing of the electronic message may include selecting a printer, which may include selecting a printer having a specific characteristic, such as manufacturer, model, or capability. Initiating printing of the electronic message may include transmitting text, embedded images, attachments, or similar data of the electronic message to the printer for printing to a physical medium. Initiating printing of the electronic message may be performed without user input, such as input by a user to confirm the printing. That is, the initiation of printing may be performed automatically in response to the determination of a match of the message to the keyword. A notification may be presented to the user to indicate that a message has been printed automatically.

Figure 3:
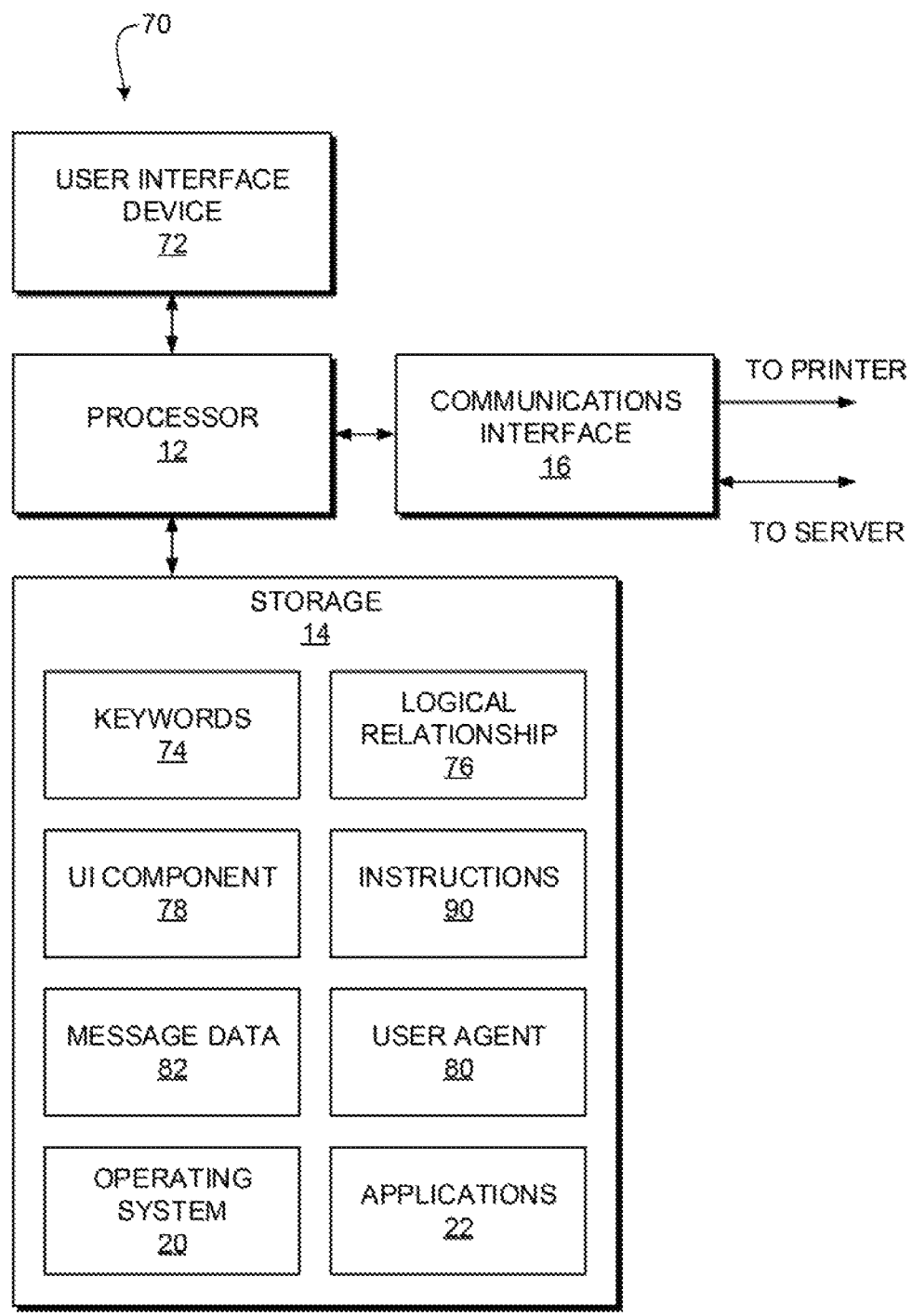
FIG. 3 is a block diagram of another example computer system.

Another example computer system 70 is shown in FIG. 3. The computer system 70 may include a processor 12, a storage 14, a communications interface 16, and a user interface 72. The processor 12, storage 14, and communications interface 16 may be as described elsewhere herein. The storage 14 may store an operating system 20 and applications 22, as described elsewhere herein. In other examples, features and aspects of the other computer systems described herein may be used with the computer system 70.

The user interface 72 may include one or more user interface devices, such as a display device, a touchscreen, a keyboard, a mouse, a button, a speaker, a microphone, or similar. The user interface 72 may be coupled to the processor 12 to present information to a user in human-perceptible form, such as by rendering a graphical user interface (GUI). The user interface 72 may receive input from a user through the GUI and provide such user input to the processor 12.

The storage 14 may maintain a plurality of keywords 74 and a logical relationship 76 among the keywords 74. Each of the keywords 74 may be similar to the keyword 24 discussed elsewhere herein.

The logical relationship 76 may provide a structured condition for matching the keywords 74 to data of electronic messages. The logical relationship 76 may include a logical operator such as AND, OR, NOT, and similar. Logical operators may be combined to form the logical relationship 76. The logical relationship 76 joins the keywords 74 into a logical expression that may be evaluated against message data to determine if the message data matches the keywords 74. For example, concerning example keywords "airline" and "ticket", the logical relationship may be defined by an AND operator, such that the logical expression evaluated to determine a match is "airline AND ticket". This means that the presence of both the keyword "airline" and the keyword "ticket" makes a match. In another example, a logical expression of "airline AND ticket OR boarding pass" is established to print messages that contain both the keyword "airline" and the keyword "ticket" and to also print messages that contain the keyword "boarding pass".

Figure 10:
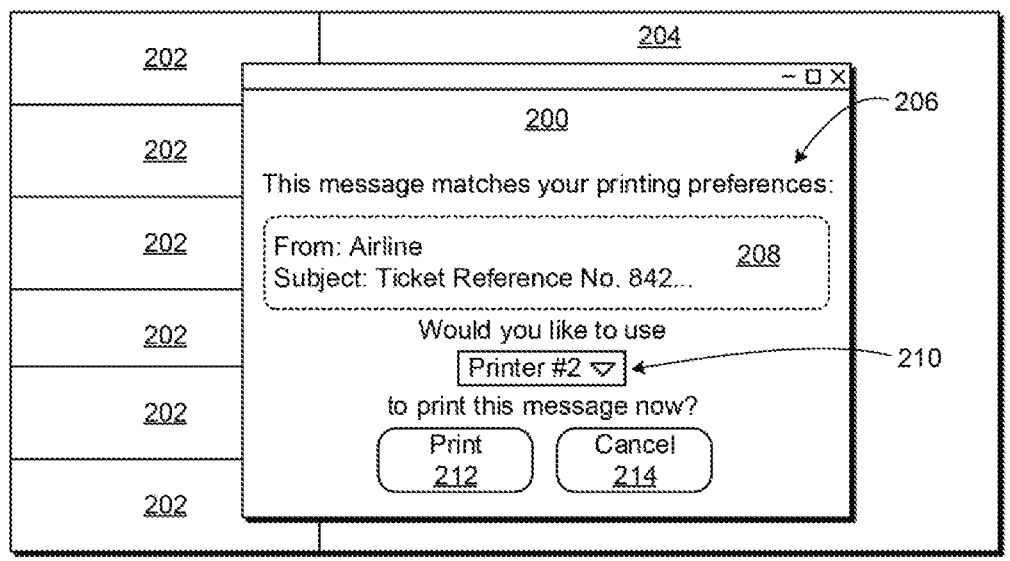
FIG. 10 is a diagram of an example user interface component that may be used to confirm or cancel printing of a message.
Figure 11:
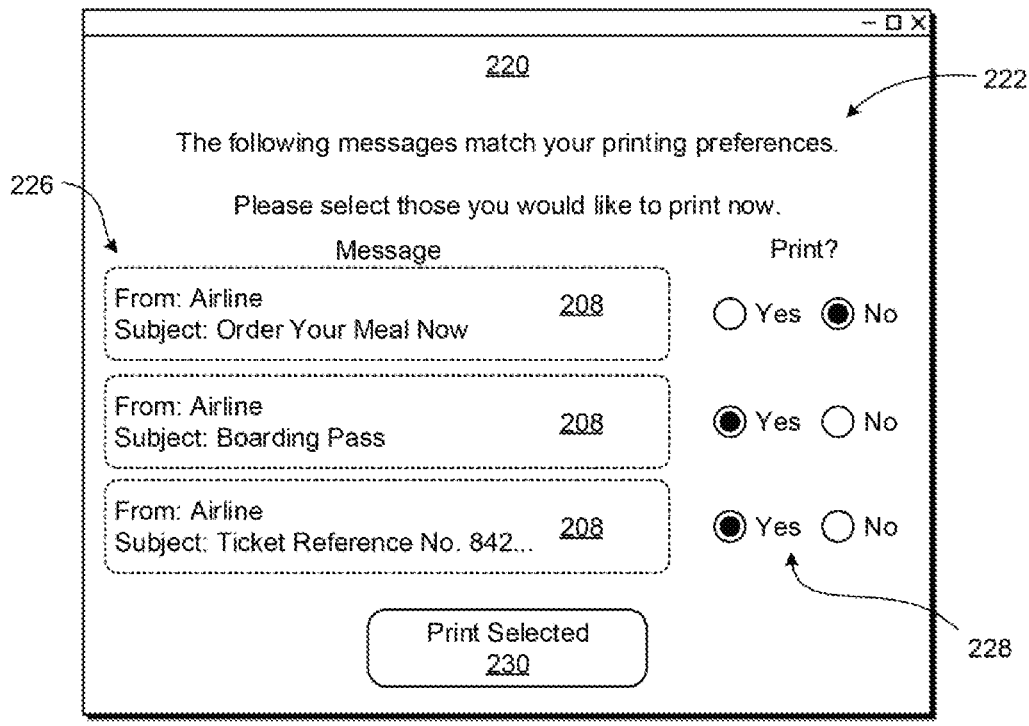
FIG. 11 is a diagram of an example user interface component that may be used to confirm or cancel printing of a plurality of messages.

The storage 14 may maintain a user interface component 78 to present a suggestion to the user via the user interface 72. The suggestion may be a suggestion to the user to print an electronic message that contains data that matches the keywords 74 according to the logical relationship 76. For example, the user interface component 78 may define a dialog box that contains suggestion text, such as "Print this email now?", and that has buttons for the user to provide a response to the suggestion, such as confirming or canceling the printing of the message. Example user interface components 78 are shown in FIGS. 10 and 11.

The storage 14 may maintain a user agent 80, such as an email user agent, web browser, and similar, discussed elsewhere herein. The user agent 80 communicates through the communications interface 16 with a server, such as an email server, that maintains electronic messages. The storage 14 may maintain data 82 of electronic messages that have been transmitted from the server to the computer system 70. Matching of keywords 74 to message data may include referencing the message data 82 in the storage 14 and may include referencing message data located at the server.

The storage 14 may maintain a set of instructions 90 that controls comparison and matching of message data with the keywords 74 according to the logical relationship 76, that triggers the presentation of the user interface component 78 when a match is determined, and that handles a user's response to the suggestion contained in the user interface component 78. When a message contains data that matches the keywords 74 as governed by the logical relationship 76, the instructions 90 present the suggestion to print the message at the user interface 72. The instructions 90 then initiate printing of the message to the printer, if the user confirms the suggestion via the user interface 72. The instructions 90 may make the keywords selectable by the user. The set of instructions 90 may suggest a plurality of messages for printing and may present such a suggested plurality of messages in a list for the user to confirm.

Figure 4:
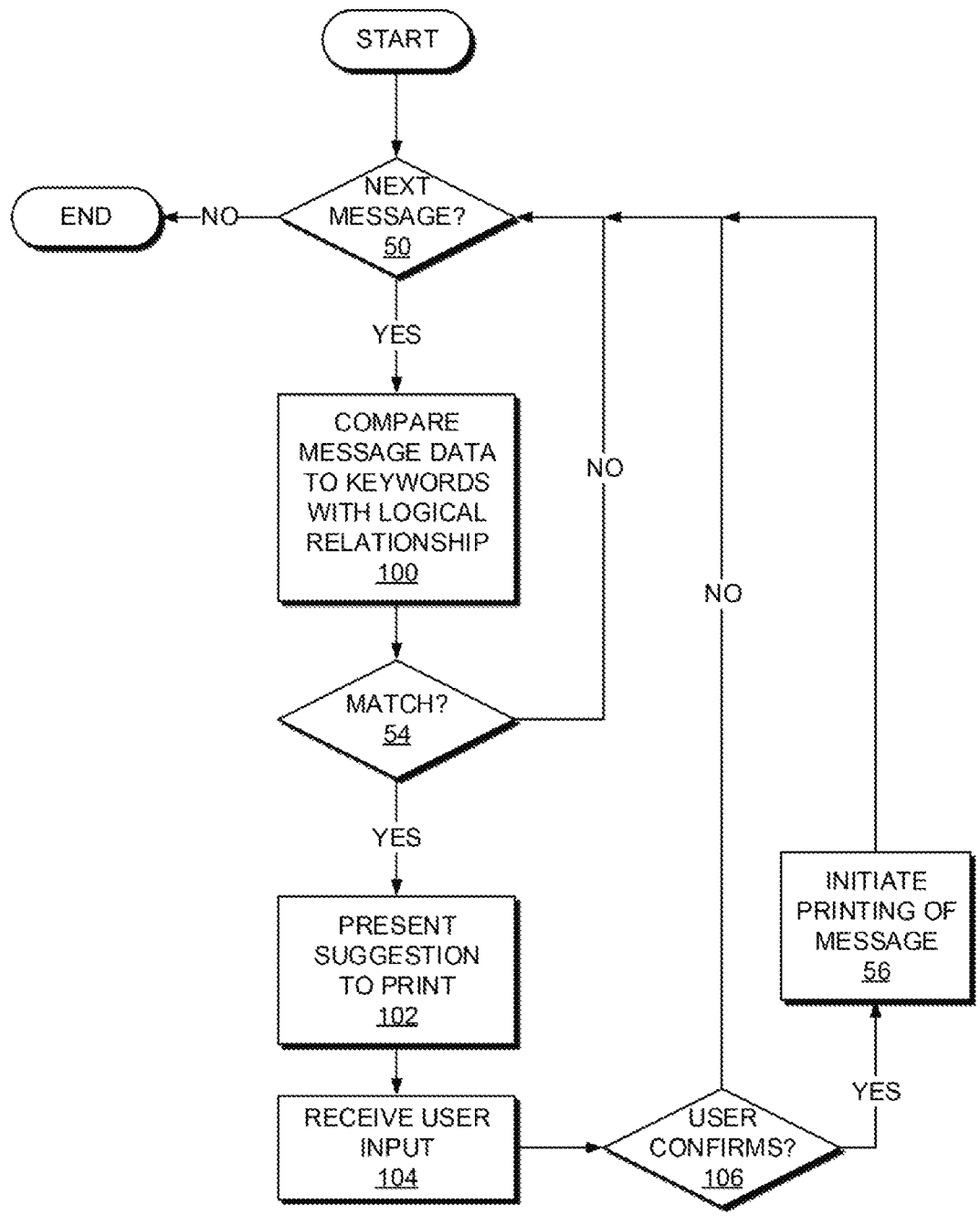
FIG. 4 is a flowchart of another example method of initiating printing of an electronic message.

FIG. 4 shows a flowchart of a method of initiating printing of an electronic message. The method may be realized with the set of instructions 90, for example.

Each message of a plurality of electronic messages may be checked, via block 50. Checking one message is possible.

At block 100, data of the message being checked may be compared to a plurality of keywords with reference to a logical relationship among the keywords. The logical relationship may establish a conjunctive condition, a disjunctive condition, a negation condition, or similar. Comparison may be performed by checking textual elements of the message against each keyword. Regular expressions, wildcards, word stemming, and similar techniques may be used, as discussed elsewhere herein. Comparison to one keyword is also possible, in which case the logical relationship may be simplified or omitted.

At block 54, any identification of a match of the electronic message with the keywords is determined. When no match is identified, the electronic message is not printed, and the next message, if any, may be checked.

At block 102, the electronic message is determined to be a match and a suggestion to print the electronic message may be presented to the user via a user interface device. For example, presenting the suggestion may include outputting a user interface component, such as the example dialog box shown in FIG. 10.

The user may provide a response to the suggestion though a user interface device, at block 104. If the response is determined to not confirm the suggestion to print the message, at block 106, then any other electronic messages may be checked before the method ends.

If the user response confirms the suggestion to print the electronic message, at block 106, then printing of the electronic message to a printer is initiated, at block 56, as discussed elsewhere herein.

Figure 5:
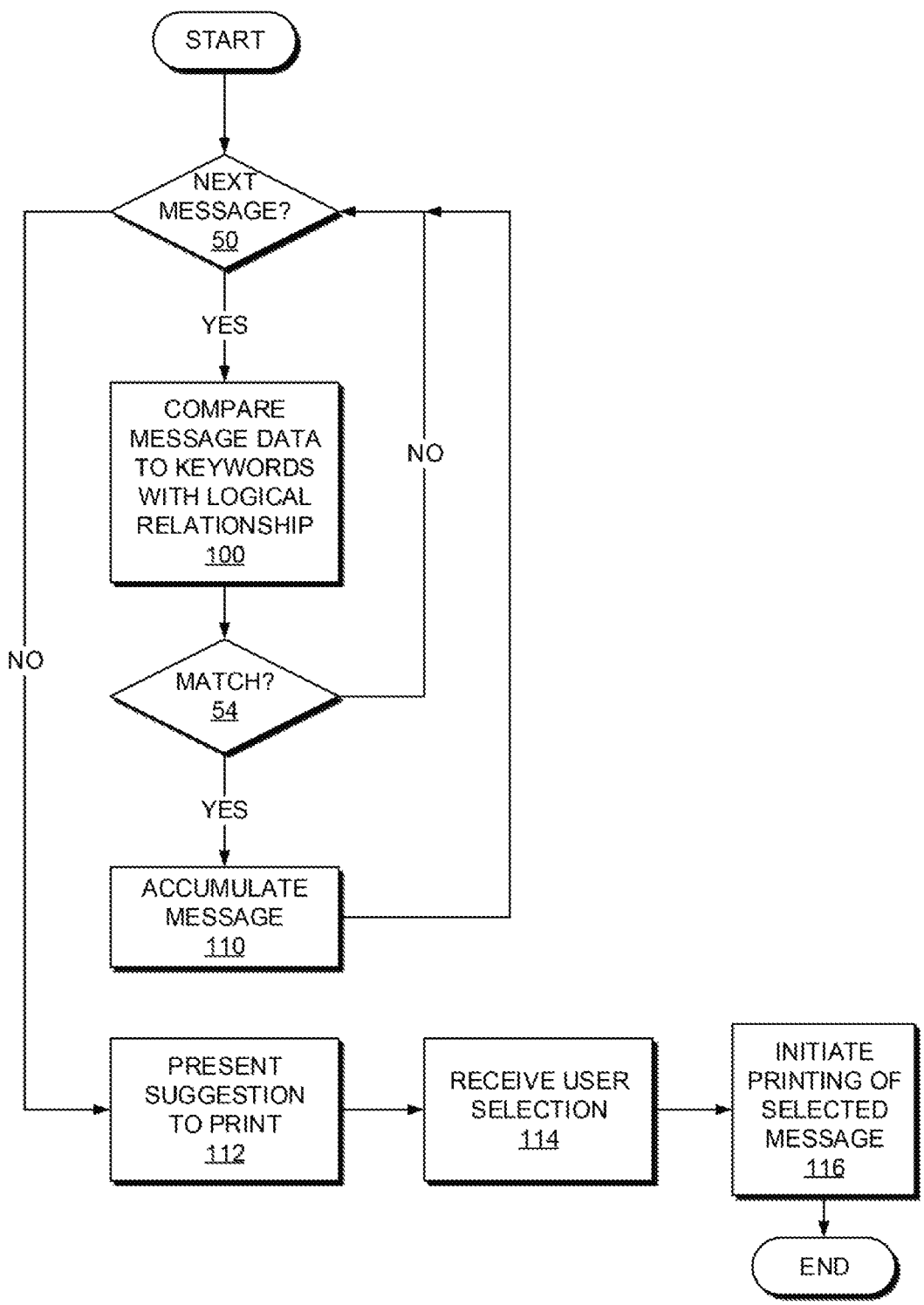
FIG. 5 is a flowchart of an example method of accumulating electronic messages to print and initiating printing of such messages.

FIG. 5 shows a method of accumulating electronic messages to print and initiating printing of such messages. The method may be realized with the set of instructions 90, for example.

Each message of a plurality of electronic messages may be checked, via block 50. Checking one message is possible.

At block 100, data of the message being checked may be compared to a plurality of keywords with reference to a logical relationship among keywords.

At block 54, any identification of a match of the electronic message with the keywords is determined. When no match is identified, the electronic message is not printed, and the next message, if any, may be checked.

When a match is identified, the message may be accumulated in a batch of messages to print, at block 110. Initiation of printing may be deferred until a group of messages, such as all newly received messages, are checked via block 50.

When there are no more messages to check, at block 50, a suggestion to print the accumulated matching electronic messages is presented to the user, at block 112. The data of the accumulated matching electronic messages may be presented with the suggestion in a list. For example, presenting the suggestion may include outputting a user interface component, such as the example dialog box shown in FIG. 11.

The user may provide a response to the suggestion, at block 114, which may include a selection of one or more of the accumulated matching electronic messages.

If the user response selects at least one of the messages, then printing of the selected message to a printer is initiated, at block 116.

Figure 6:
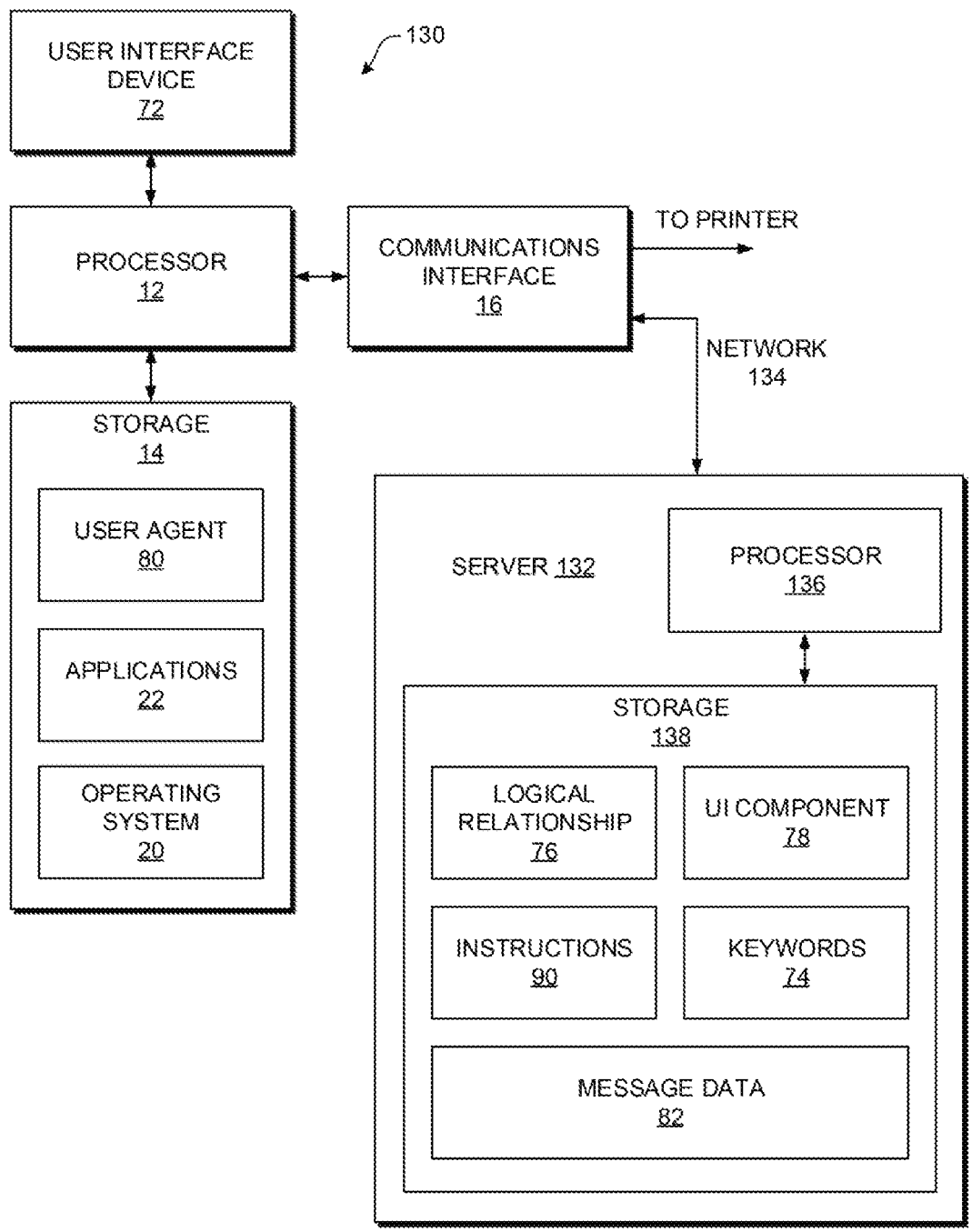
FIG. 6 is a block diagram of another example computer system and an example server.

Another example computer system 130, as shown in FIG. 6, may include a processor 12, a storage 14, a communications interface 16, and a user interface 72. The processor 12, storage 14, communications interface 16, and user interface 72 may be as described elsewhere herein. The storage 14 may store an operating system 20, applications 22, and a user agent 80, as described elsewhere herein. In other examples, features and aspects of the other computer systems described herein may be used with the computer system 130.

The communications interface 16 may be connected to a server 132 via a computer network 134, such as a LAN, WAN, the Internet, and similar. The user agent 80 may communicate electronic messages with the server 132 via the network 134. The server 132 may maintain user accounts and message data 82 for a plurality of users operating a plurality of computer systems 130.

The server 132 may include a processor 136 and a storage 138. The storage 138 may include a machine-readable storage medium that may be encoded with instructions executable by the processor 136 to initiate printing of electronic messages. Examples of processors and storage are provided elsewhere herein.

The server 132 may maintain keywords 74, a logical relationship 76, a user interface component 78, and a set of instructions 90, as described elsewhere herein. The server 132 may execute the set of instructions 90 to control comparison and matching of message data 82 with the keywords 74 according to the logical relationship 76. The server 132 may trigger the presentation of the user interface component 78 and handle user response, through the network 134 and user interface 72. As such, users may be individually provided with suggestions to print their messages and may respond accordingly to initiate such printing.

Distinct keywords 74 and logical relationships 76 may be maintained at the server 132 for each user. Keywords 74 and logical relationships 76 may be common to a plurality of users.

Figure 7:
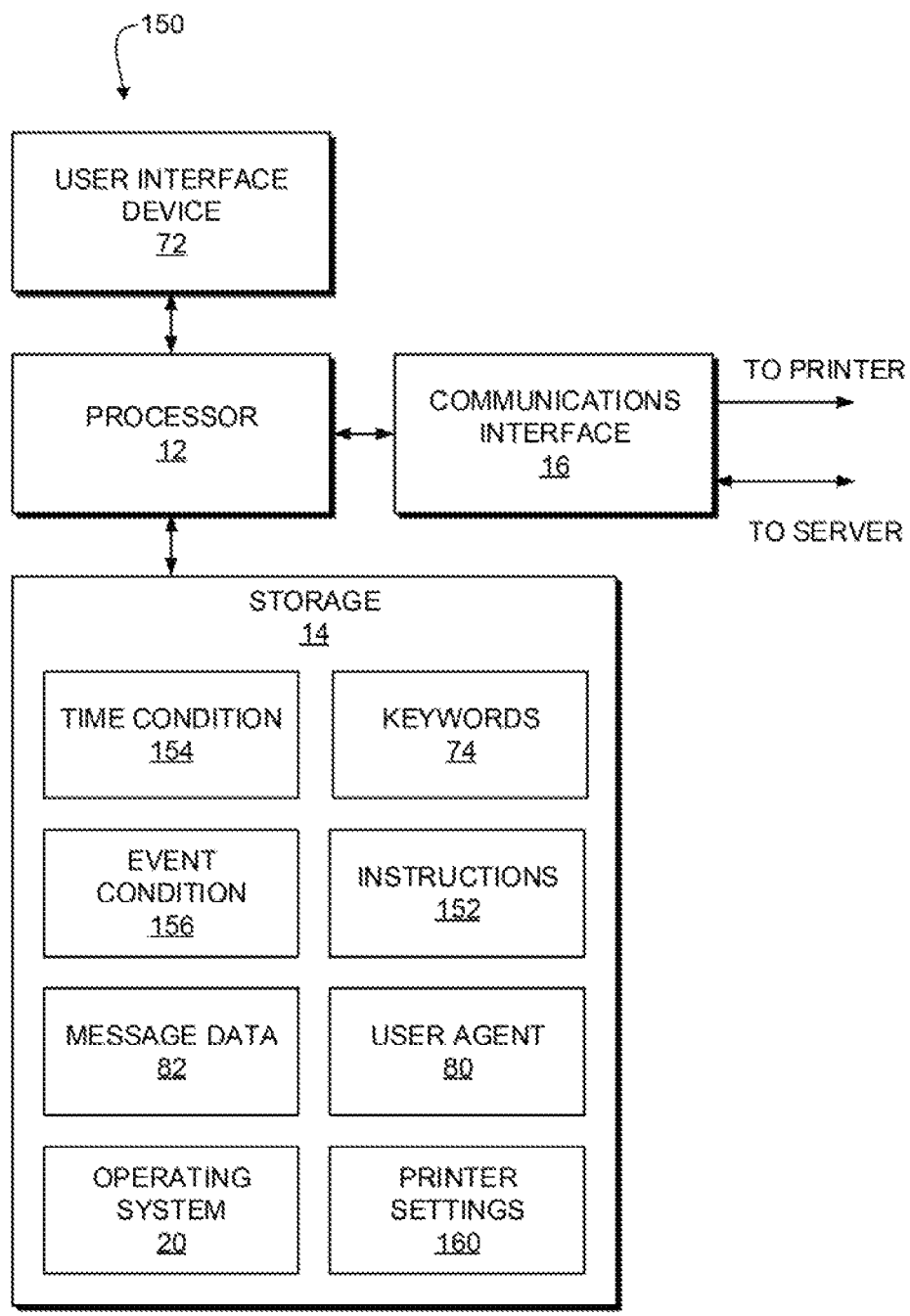
FIG. 7 is a block diagram of another example computer system, which may reference a time condition and may reference an event condition to initiate printing of messages.

FIG. 7 shows another example computer system 150 that may include a processor 12, a storage 14, a communications interface 16, and a user interface 72. The processor 12, storage 14, communications interface 16, and user interface 72 may be as described elsewhere herein. The storage 14 may store an operating system 20, applications 22, a user agent 80, message data 82, and keywords 74. In other examples, features and aspects of the other computer systems described herein may be used with the computer system 150.

The storage 14 may store a set of instructions 152 to compare message data to keywords 74 and initiate printing of messages that match the keywords 74 to a physical medium, such as paper. The instructions 152 may reference a logical relationship to combine keywords 74 when determining matches. The instructions 152 may present a suggestion for a user to confirm prior to printing a message.

The storage 14 may store a time condition 154. The time condition 154 may specify a time, a schedule, or a frequency for initiating printing of messages that match keywords 74. For example, a time may be specified as a time and day, such as 3:00 PM every day. An example schedule may specify times and specific days, such as 9:00 AM on weekdays and 1:00 PM on weekends. An example frequency may be every five minutes, every 1 hour, once per day, or similar.

The instructions 152 may compare message data to the keywords 74 at a time defined by the time condition 154. When the time condition 154 is met, the instructions 152 compare message data to keywords 74 and initiate printing of any matching messages. The instructions 152 may present a suggestion to the user and handle the user's response prior to initiating printing. For example, the instructions 152 may compare messages to keywords 74 at 3:00 PM every day and then present a suggestion to the user to print messages that match the keywords 74.

The instructions 152 may compare message data to keywords 74 at a time unbound by the time condition 154. The instructions 152 may present a suggestion to print any matching messages and handle the user's response, when the time condition 154 is met. That is, comparison of messages to keywords 74 may be performed as a background operation, with the time condition 154 controlling when a suggestion to print is presented to the user.

The storage 14 may store an event condition 156. The event condition may specify that detection of an event that may occur at the user agent 80 triggers printing of messages that match keywords 74. Example events include a user logging into a messaging account through the user agent 80, the user agent 80 being launched, the user agent receiving focus 80, the user agent 80 being opened, the user agent 80 receiving a new message, and similar. When the instructions 152 are implemented as a plug-in to the user agent 80, an event at the user agent 80 may be exposed to the instructions 152 through an application programming interface (API) or similar programmatic structure, so that a portion of the instructions 152 may be executable upon the event occurring.

The instructions 152 may compare message data to the keywords 74 in response to the event specified in the event condition 156. When the event condition 156 is met, the instructions 152 compare message data to keywords 74 and initiate printing of any matching messages. The instructions 152 may present a suggestion to the user and handle the user's response prior to initiating printing. For example, the instructions 152 may compare a newly received message to the keywords 74 when the newly received message is received at the user agent 80. The instructions 152 may then present a suggestion to the user to print the newly received message if the newly received message contains data that matches the keywords 74.

The storage 14 may further store printer settings 160. Printer settings 160 may store parameters for printing to physical media for one or more printers that may be coupled to the communications interface 16. Printer settings 160 may store an indication of a default printer to which data is printed when no other printer is selected.

The instructions 152 may select a printer for printing electronic messages that match keywords. Selecting a printer may include identifying a printer having a specific characteristic, such as manufacturer, model, capability, or similar, from a plurality of printers that may be available. This may allow a printer better capable of printing electronic messages be selected over another printer, such as a default printer.

Selecting a printer may override a default printer specified in the printer settings 160 with another printer having a specific characteristic. For example, if the default printer is not of a specific manufacturer, the instructions 152 select a printer from the specified manufacturer, if available, for printing messages that match the keywords.

Figure 8:
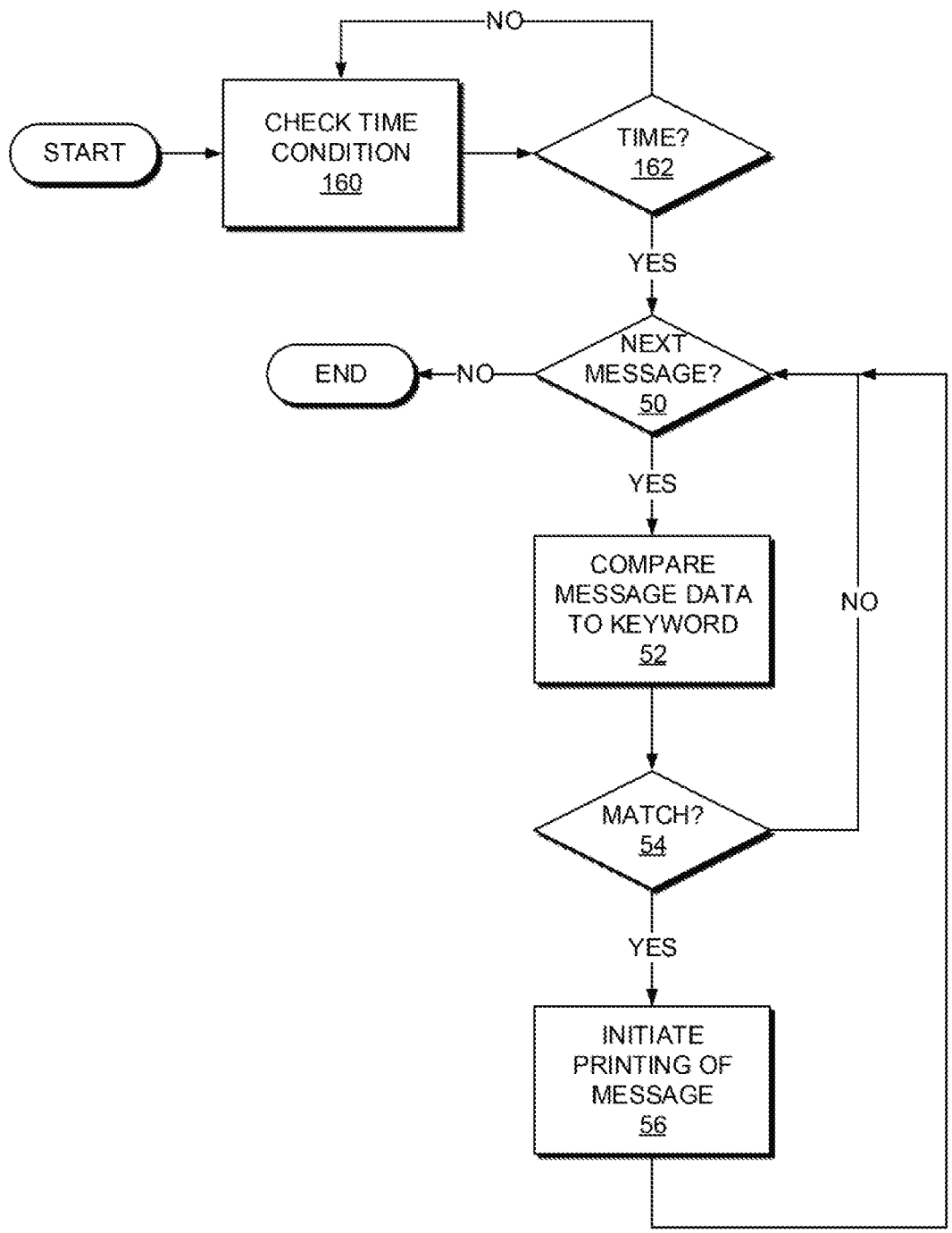
FIG. 8 is a flowchart of an example method of initiating printing of an electronic message using a time condition.

FIG. 8 shows an example method of checking a time condition prior to initiating printing of an electronic message that contains data that matches a keyword. The method may be realized with the set of instructions 152, for example.

At block 160, the time condition is checked. Example time conditions are discussed elsewhere in this disclosure. An example time condition may be a frequency of one hour. That is, messages are compared to a keyword once an hour. If the time condition is met, at block 162, then the method proceeds to compare data of messages against the keyword and initiate printing of messages that contain data that match the keyword, in blocks 50-56, as discussed elsewhere herein. A plurality of keywords may be used, as well as other features discussed herein, such as a logical relationship among keywords.

Figure 9:
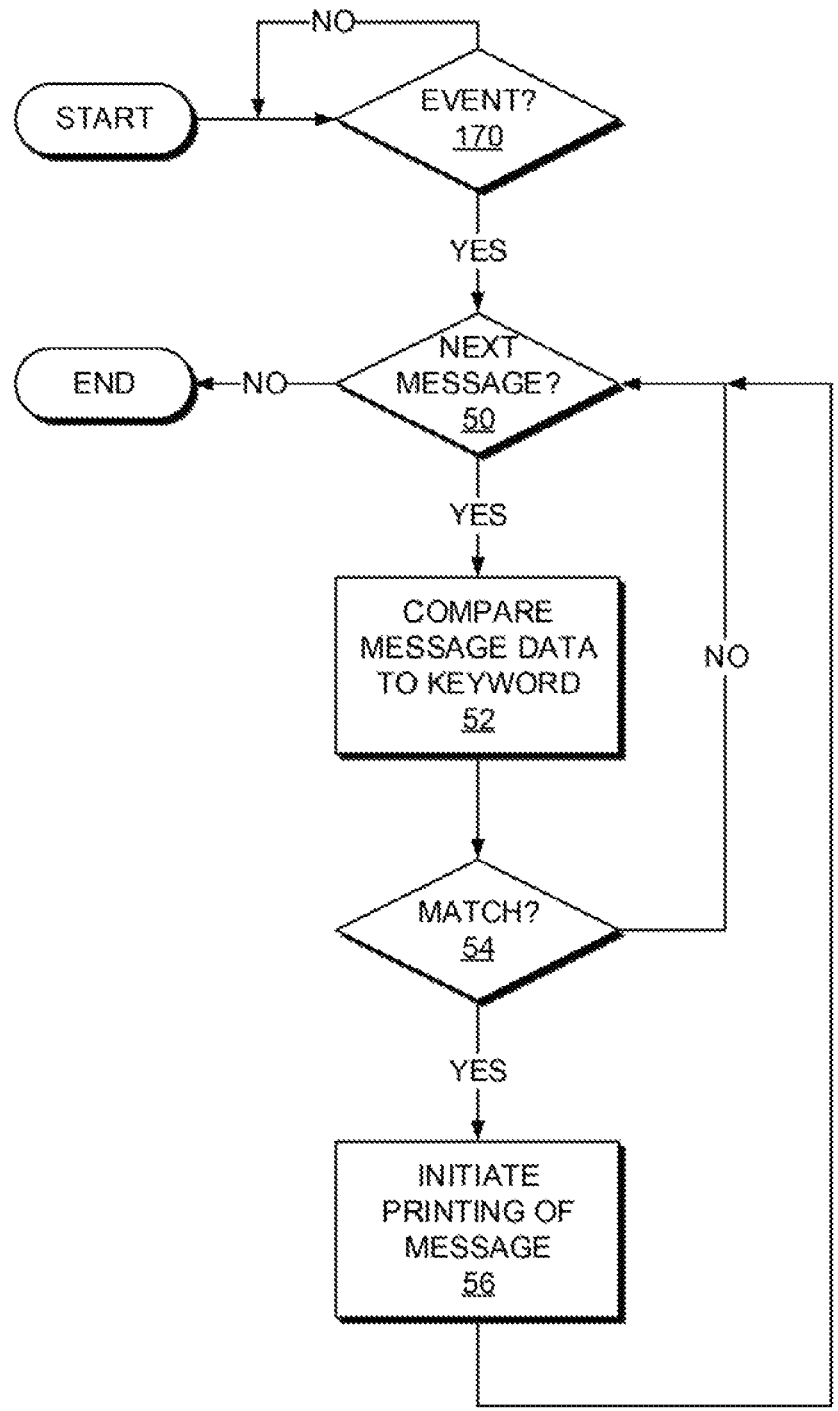
FIG. 9 is a flowchart of an example method of initiating printing of an electronic message using an event condition.

FIG. 9 shows an example method of checking an event condition prior to initiating printing of an electronic message that contains data that matches a keyword. The method may be realized with the set of instructions 152, for example.

When an event occurs at a user agent that maintains electronic messages, an event condition is checked, at block 170. Example event conditions are discussed elsewhere in this disclosure. An example event condition may be a log-in event at the user agent, the log-in event occurring when a user successfully logs in to their account. In response to the event triggering the event condition, at block 170, the method proceeds to compare data of messages against the keyword and initiate printing of messages that contain data that match the keyword, in blocks 50-56, as discussed elsewhere herein. A plurality of keywords may be used, as well as other features discussed herein, such as a logical relationship among keywords.

An example dialog box 200 for a user to confirm or cancel printing of a message is shown in FIG. 10. The dialog box 200 may be presented as overlaying a user interface component of a user agent for electronic messages, which may include a listing of messages 202, a message reading pane 204 that displays message data, and similar.

The dialog box 200 may include a suggestion 206 in the form of human-intelligible information that suggests the message be printed. The dialog box 200 may include data 208 of the suggested message, such as a sender identifier, subject line text, body text, and similar, which is shown to the user to assist the user in deciding whether or not to confirm the printing of the message.

The dialog box 200 may include a printer selector 210, such as a dropdown list, to indicate to the user which printer will print the suggested message. The printer selector 210 may initially select a printer having a specific characteristic, such as manufacturer, model, or capability. The printer selector 210 may allow the user to change the selected printer.

The dialog box 200 may include a user input control, such as buttons 212, 214, to confirm the suggestion and trigger the initiation of printing of the message or to dismiss the dialog box 200 without printing of the message.

An example dialog box 220 for a user to confirm or cancel printing of a plurality of messages is shown in FIG. 11. The dialog box 220 may be presented as overlaying a user interface component of a user agent for electronic messages.

The dialog box 220 may include a suggestion 222 in the form of human-intelligible information that suggests that the messages be printed. The dialog box 220 may include message data 208 which is shown to the user to assist the user in deciding whether or not to confirm the printing of each message. Elements of message data 208 corresponding to each message may be arranged in a list 226, as shown. A user selection control 228, such as radio buttons, a checkbox, or similar, may be provided for each message that is suggested to be printed. The user is thus able to individually select which of the suggested messages to print. The dialog box 220 may include a user interface control, such as a button 230, for the user to confirm that the selected messages should be printed and to trigger the initiation of printing of the selected messages.

FIG. 12 shows an example data structure 250 that may be used by any of the sets of instructions and methods discussed herein to track messages for which a suggestion to print has been presented to the user. The data structure 250 may be used to prevent presenting more than one suggestion to print the same message.

The data structure 250 may define a unique message identifier 252, which may be a number, code, a hash of message data, or similar that uniquely identifies each message. The unique message identifier 252 may be the same identifier used by a user agent to identify messages. Example unique message identifiers 252 depicted begin at a value of 1000.

The data structure 250 may define a suggestion data element 254 associated with the unique message identifier 252. The suggestion data element 254 may store a value indicative of whether a suggestion to print the respective message has been presented to the user. The suggestion data element 254 may be of a Boolean data type or a similar data type. Newly arrived messages may be assigned an initial value of FALSE or logical 0, for example, indicating that a suggestion to print has not been presented. After the suggestion to print has been presented to the user, the suggestion data element 254 may be assigned a value of TRUE or logical 1, for example. When identifying messages to compare to a keyword, messages having a suggestion data element 254 equal to TRUE, or logical 1, may be ignored to avoid making repeated suggestions for the same message.

FIG. 13 shows a user interface component 260 to allow a user to view and make at least one selection that determines how the matching and printing of messages is performed. The user interface component 260 may be displayed at a user interface device.

The user interface component 260 may allow a keyword to be selectable by the user. The user interface component 260 may include a text control 262, such as a text box, to receive input from a user of a group of one or more keywords to match with message data.

The user interface component 260 may include a logical relationship control 264, such as a dropdown list, to receive input from the user of a logical relationship among two or more groups of keywords inputted into text elements 262.

The user interface component 260 may include a time condition control 266, such as a checkbox, text box, and dropdown list, to receive input from the user of a time condition that may control when to perform keyword matching and present a suggestion to print a message.

The user interface component 260 may include an event condition control 268, such as one or more checkboxes, to receive input from the user of an event condition that may trigger performing keyword matching and may trigger presenting a suggestion to print a message.

The user interface component 260 may include an automatic printing control 270, such as a pair of radio buttons, to receive input from the user of a selection of whether to print messages that match keywords automatically or whether to present a suggestion to print messages and request conformation from the user before printing.

A set of instructions may be provided as a plug-in to a user agent for electronic messages. The set of instructions may communicate with the user agent to obtain message data, to present a suggestion to print a message, to handle a user's response, and to initiate printing of the message. A plug-in may also be referred to as an add-on, add-in, extension, and similar. Various user agents may have APIs and other components that may be used to implement a plug-in. For example, Microsoft Outlook™ provides an object model, Primary Interop Assembly (PIA), Messaging API (MAPI), and JavaScript™ API to facilitate the creation of add-ins for processing email messages. In another example, Gmail™ provides a representational state transfer (RESTful) API with JavaScript™ Object Notation (JSON) payload to facilitate the implementation of new email functionality.

A set of instructions may be preinstalled in storage of a computer system, such as a laptop computer, desktop computer, or similar, prior to a user using the computer system. A set of instructions may be offered to a user for download from a server. A set of instructions may be provided on a non-transitory machine-readable storage medium that physically accompanies a printer.

Printing messages based on matching message data to keywords, as discussed above, may increase user convenience, in that users need not remember various kinds of messages that they wish to print. Suggesting messages to print and initiating printing of same upon user confirmation may increase the accuracy of a machine-driven message selection process. In addition, system efficiency may be increased as a user may cancel the printing of a message that matches a keyword, which may save processing and printer resources that otherwise would have been expended in printing the message.

It should be recognized that features and aspects of the various examples provided above can be combined into further examples that also fall within the scope of the present disclosure.

The invention claimed is:

1. A computer system comprising:
   a processor;
   a storage coupled to the processor;
   a user interface to receive input from a user and present information to the user in human-perceptible form; and
   a set of instructions to cooperate with the processor and the storage to:
   compare data of a plurality of electronic messages to a keyword;
   present to the user via the user interface a suggestion to print an electronic message that contains data that matches the keyword;
   receive from the user via the user interface a response to the suggestion; and
   when the response confirms the suggestion to print the electronic message, initiate printing of the electronic message to a printer.

2. The computer system of claim 1, wherein the set of instructions is to present the suggestion in response to an event at a user agent that is to maintain the plurality of electronic messages.

3. The computer system of claim 1, wherein the set of instructions is to present the suggestion at a time defined by a time condition.

4. The computer system of claim 1, wherein the set of instructions is to make the keyword selectable by the user via the user interface.

5. The computer system of claim 1, wherein the set of instructions is to present a list of at least one electronic message that contains data that matches the keyword.

6. The computer system of claim 1, wherein the plurality of electronic messages comprise email, and the set of instructions is to communicate with a user agent for email to compare the plurality of electronic messages to the keyword.

7. The computer system of claim 1, wherein the set of instructions is to present the suggestion in a dialog box.

8. A non-transitory machine-readable storage medium encoded with instructions executable by a processor, the non-transitory machine-readable storage medium comprising:
   instructions to compare data of a plurality of electronic messages to a keyword;
   instructions to identify an electronic message that contains data that matches the keyword; and
   instructions to initiate printing of the electronic message to a printer.

9. The non-transitory machine-readable storage medium of claim 8, comprising instructions to initiate printing of the electronic message in response to an event at a user agent that is to maintain the plurality of electronic messages.

10. The non-transitory machine-readable storage medium of claim 8, comprising instructions to initiate printing of the electronic message at a time defined by a time condition.

11. The non-transitory machine-readable storage medium of claim 8, comprising instructions to initiate printing of the electronic message without user input.

12. The non-transitory machine-readable storage medium of claim 8, wherein the plurality of electronic messages comprise email, the non-transitory machine-readable storage medium comprising instructions to communicate with a user agent for email to compare the plurality of electronic messages to the keyword.

13. A method comprising:
   comparing data of a plurality of electronic messages to a plurality of keywords;
   presenting to a user via a user interface a suggestion to print an electronic message that contains data that matches at least one keyword of the plurality of keywords;
   receiving from the user via the user interface a response to the suggestion; and
   initiating printing of the electronic message to a printer when the response confirms the suggestion to print the electronic message.

14. The method of claim 13, wherein the plurality of electronic messages comprise email, and wherein comparing the data of the plurality of electronic messages to the plurality of keywords comprises communicating with a user agent for email to obtain the data of the plurality of electronic messages.

15. The method of claim 13, wherein initiating printing of the electronic message to the printer comprises selecting the printer from a plurality of printers.

* * * * *